C. C. RUSSELL.
MOTOR GOVERNOR.
APPLICATION FILED JAN. 11, 1916.

1,190,593.

Patented July 11, 1916.
2 SHEETS—SHEET 1.

Inventor
Charles C. Russell.
By Gillett & Gillson Att'ys.

C. C. RUSSELL.
MOTOR GOVERNOR.
APPLICATION FILED JAN. 11, 1916.

1,190,593.

Patented July 11, 1916.
2 SHEETS—SHEET 2.

Inventor:
Charles C. Russell,
By Gillson & Gillson, Attys.

UNITED STATES PATENT OFFICE.

CHARLES C. RUSSELL, OF CHICAGO, ILLINOIS.

MOTOR-GOVERNOR.

1,190,593.   Specification of Letters Patent.   Patented July 11, 1916.

Application filed January 11, 1916. Serial No. 71,464.

*To all whom it may concern:*

Be it known that I, CHARLES C. RUSSELL, a citizen of the United States, and resident of Chicago, county of Cook, and State of Illinois, have invented certain new and useful Improvements in Motor-Governors, of which the following is a specification and which are illustrated in the accompanying drawings, forming a part thereof.

The invention relates to motor governors, and more especially to governors for spring motors, such for example as those employed in talking machines, but the invention is not limited in its application to motors of this type.

The object of the invention is to simplify and improve the construction of motor governors having more particular reference to the reduction of the number of parts and to the provision of a governor which shall insure the smooth running of the motor throughout a wide range of regulated speeds.

Figure 1:
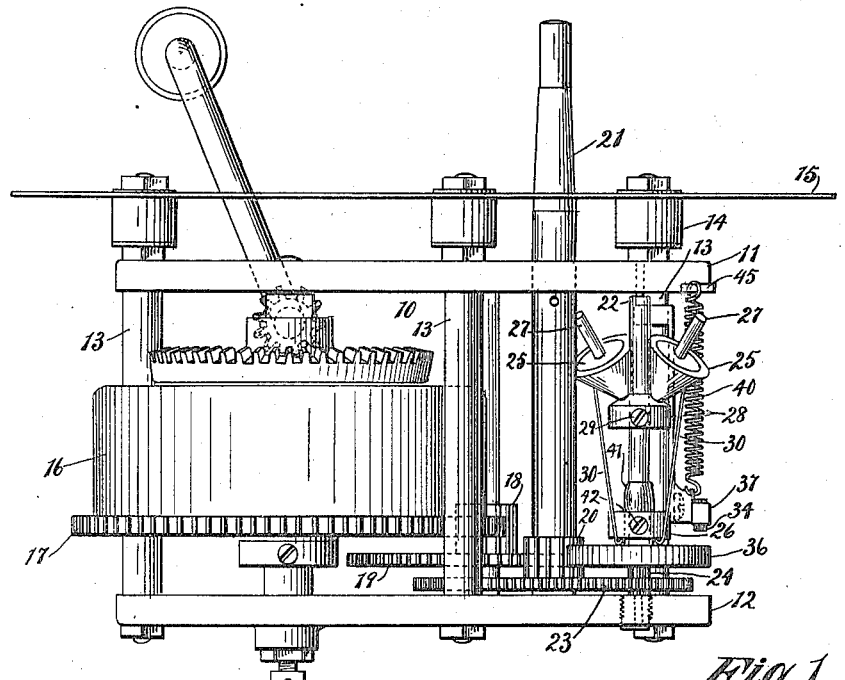
Figure 2:
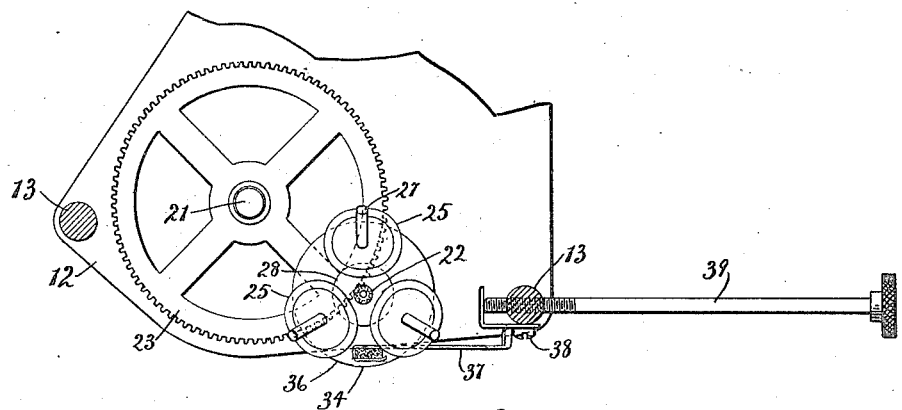
Figure 3:
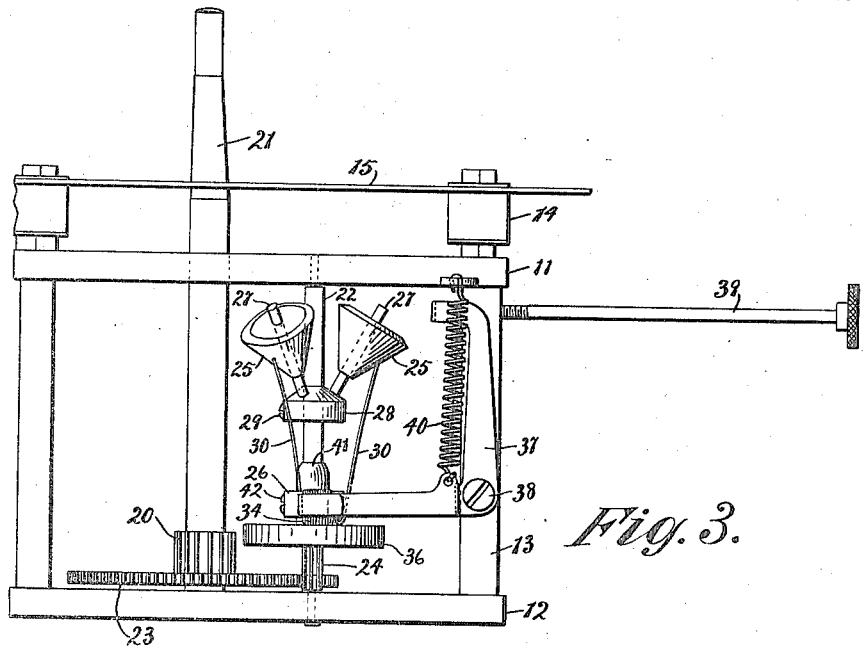
Figure 4:
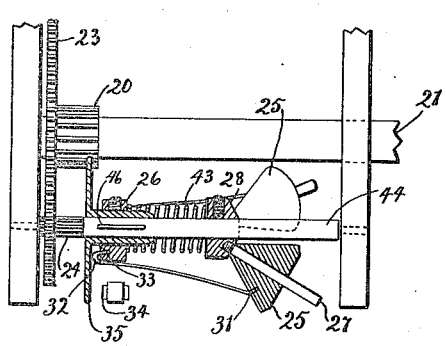
Figure 5:
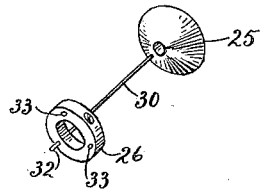

In the accompanying drawings, Figure 1 is a side elevation of a talking machine motor equipped with an improved governor of a form provided by the invention, Fig. 2 is a detail plan view of the same with parts of the frame shown in section, Fig. 3 shows the governor and a detail of the motor in end elevation with the parts of the governor in a different position than in Fig. 1, Fig. 4 is a side elevation partly in section showing a modified form of the governor, and Fig. 5 is a perspective view showing a detail of the construction.

When the improved governor is to be employed as a tempo regulator for talking machines, it will usually be associated with a spring motor and its frame, generally designated 10. As shown, the motor frame comprises top and bottom plates 11, 12, and a plurality of upright connecting posts 13, some of the posts 13 being extended through the top plate 11, as at 14, and serving for securing the motor against the under side of a plate, as 15, which may constitute a removable square of the wall of the talking machine case. The spring motor comprises the barrel 16, the main drive spindle 21, and the train of gears, as 17, 18, 19 and 20, for operatively connecting these parts.

Both of the illustrated forms of the improved governor comprise a rotating spindle, as 22, (Figs. 1, 2 and 3) or 44 (Fig. 4). When the spindle, as 22, occupies an upright position as in Figs. 1, 2 and 3, it may extend between the plates 11 and 12, in which case its opposite ends are conveniently journaled in said plates. The arrangement contemplates that the spindle 22 or 44 is to be rotated at high speed. Figs. 1, 2 and 3 show this as being accomplished by connecting the spindle 22 with the main drive spindle 21 through the speed multiplying gears, 23 and 24.

The parts of the governor which are movable with reference to the rotating spindle 22 or 44, include a plurality of weights 25, and a collar 26, the latter having a longitudinal sliding movement along the spindle but being rotatively connected therewith. The weights 25 may be as numerous as desired but all are to be symmetrically located with respect to the axis of the rotating spindle. The drawings show the use of three such weights in each of the illustrated forms of construction, each of the weights being slidingly mounted upon an arm 27 which extends obliquely outward from the spindle 22 or 44 and is fixed thereto. A convenient form of construction is provided if the inner ends of all of the arms 27 are fixed in a collar 28 and this collar is secured upon the spindle 22 or 44, as by a set screw 29. The formation of the several weights 25 in the shape of truncated cones with the arms 27 extending axially therethrough and with the smaller ends of the cones located adjacent the corresponding spindle 22 or 44 provides a compact arrangement while still permitting the center of gravity of each weight being located at an effective distance from the axis of rotation.

The means provided for controlling the speed of the motor is preferably operated by axial movement of the collar 26. For this purpose the collar 26 is connected with each of the weights 25. A form of connection which insures a smooth operation of the parts and does not interfere with the movement of the weights 25 upon the arms 27 is provided by the extension of a flexible length of piano wire 30 between each weight 25 and the collar 26. The two ends of each of the said lengths 30 of piano wire may be connected with the collar 26 and with the corresponding weight 25 in any convenient manner, but it has been found desirable to insert one end of the length 30 of the piano wire into an opening 31 (Fig. 4) in the side of the corresponding weight 25, and to secure the same in place by solder. The other end of each length 30 of piano wire is then preferably extended beyond the collar 26 and is formed into a hook 32 for engagement with a socket 33 in the remote side of the collar. This form of connection requires the use of only a small number of parts and facilitates the assembling of the apparatus while still permitting a very accurate adjustment to be made with respect to the length of the connection between the several weights 25 and the collar 26 to insure a symmetrical location of all the weights 25 about the axis of rotation.

In the association of the governor with a talking machine motor, the speed of the motor is preferably controlled by the engagement of a friction shoe 34 with a rotating disk, as 35 or 36. The friction shoe 34 may be adjustably positioned in front of the corresponding disk, as by being mounted at the end of one of the arms of a bell crank lever 37. In the arrangement shown in Figs. 1, 2 and 3, the bell crank lever 37 is pivotally secured against one of the upright connecting posts 13 of the motor frame, as at 38 (Fig. 3). It is conveniently moved for adjusting the position of the friction shoe 34 by the engagement with the bell crank lever of the end of a screw shaft 39. This screw shaft may have threaded engagement with the same post 13 to which the bell crank lever is pivotally attached. If now a spring, as 40, is provided to react between the bell crank lever 37 and a fixed part of the motor frame, as at 45, for holding the bell crank lever in contact with the end of the screw shaft 39, the screw shaft constitutes the tempo regulating screw of the talking machine.

In each of the illustrated forms of construction the disk 35 or 36 is caused to move with the collar 26 by being located upon the spindle 22 beyond the collar and by being provided with a hub 41 which extends through the said collar and to which the collar is detachably secured, as by means of a set screw 42. This form of construction is advantageous as the provision of a long hub 41 for the disk 35 or 36 and the location of the collar 26 upon said hub provides a long bearing for both the disk and the collar upon the corresponding spindle 22, or 44, while the position of the disk directly adjacent the collar prevents the disengagement of the hooked ends 32 of the connectors 30 from the sockets 33 in the collar. The rotation of the collar 26 and disk 35 or 36 with the spindle 22, or 44, is insured by providing a splined connection 46 between the hub 41 and the corresponding spindle.

In the form of construction illustrated in Fig. 4, a spring 43 is coiled about the spindle 44, and reacts between the fixed collar 28 and the movable collar 26. It will be understood, however, that when the spindle, as 44, has attained a considerable speed and the disk 35 has been brought into contact with the friction shoe 34, the resistance of the spring 43 to further outward movement of the weights 25 is inconsequential and the function of the spring is rather to move the weights 25 inwardly upon the arms 27 when the speed of the spindle is reduced. For this purpose the spring 43 need not be of great strength and when the parts are associated upon a spindle, 22, which is located in the upright position illustrated in Figs. 1, 2 and 3, the spring may be omitted entirely if the disk, as 36, be made of such thickness as to insure the inward movement of the weights 25 upon the arms 27 by gravity when the spindle 22 is at rest. In either form of construction the adjusted position of the friction shoe 34 determines the speed of the motor.

In the form of construction illustrated in Figs. 1, 2 and 3, the speed of the drive spindle 21 is increased as the friction shoe 34 is elevated by retracting the tempo regulating screw 39. The outward movement of all of the weights 25 is resisted with exactly the same force. The symmetrical location of all of the weights 25 with reference to the axis of the spindle 22 or 44 is thereby insured at all times, whereby smoothness in operation and great durability are obtained.

I claim as my invention,—

1. In a motor governor, in combination, a rotating spindle, a collar sliding on the spindle, an arm fixed to the spindle and projecting obliquely outward therefrom in a direction which is inclined away from the collar, a weight sliding on the arm, a flexible wire having its opposite ends connected to the weight and collar and extending directly between said parts, and motor regulating means operated by the sliding movement of the collar.

2. In a motor governor, in combination, a rotating spindle, a disk having an upstanding hub sliding on the spindle, a collar detachably mounted on the hub of the disk, an arm fixed to the spindle above the collar and disk and projecting obliquely outward from the axis of the spindle in a direction which is inclined away from the said collar and disk, a weight sliding on the arm, a wire having one end fixed to the weight and having its other end held between the collar and disk and a friction shoe adjustably supported over the disk.

3. In a motor governor, in combination, a rotating spindle, a disk having an upstanding hub sliding on the spindle, a collar detachably mounted on the hub of the disk, a plurality of arms fixed to the spindle over the collar and disk and projecting obliquely outward from the axis of the spindle in directions which are inclined away from the collar and disk, the said arms being symmetrically arranged with reference to the axis of the spindle, a weight sliding on each arm, a plurality of flexible wires each having one end fixed in one of the said weights, and the other end fixed in the collar and extending directly between said parts, and a friction shoe adjustably supported over the disk.

4. In a motor governor, in combination, a rotating spindle, a member sliding on the spindle and rotating with it, an arm fixed to the spindle and projecting obliquely outward therefrom in a direction which is inclined away from the said sliding member, a weight sliding on the arm, a flexible wire having its opposite ends connected to the weight and the first mentioned sliding member and extending directly between said parts, and a friction shoe adjustably supported in the path of sliding movement of the first mentioned sliding member.

5. In a motor governor, in combination, a rotating spindle, a disk having an upstanding hub sliding on the spindle, a collar detachably mounted on the hub of the disk, a plurality of arms fixed to the spindle over the collar and disk and projecting obliquely outward from the axis of the spindle, the said arms being symmetrically arranged with reference to the axis of the spindle, a weight sliding on each arm, a member connecting each weight with the collar and extending directly between the said parts, and a friction shoe adjustably supported in the path of sliding movement of the disk.

CHARLES C. RUSSELL.

Copies of this patent may be obtained for five cents each, by addressing the "Commissioner of Patents, Washington, D. C."